United States Patent
Liu et al.

(10) Patent No.: US 9,226,157 B2
(45) Date of Patent: Dec. 29, 2015

(54) CELL ACCESS PROCESSING METHOD AND APPARATUS AND COMMUNICATION SYSTEM

(71) Applicant: Huawei Device Co., LTD, Shenzhen (CN)

(72) Inventors: Juan Liu, Shenzhen (CN); Guoqiao Chen, Beijing (CN); Chenliang Gao, Beijing (CN); Zhi Guan, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 188 days.

(21) Appl. No.: 14/015,540

(22) Filed: Aug. 30, 2013

(65) Prior Publication Data

US 2014/0003350 A1    Jan. 2, 2014

Related U.S. Application Data

(63) Continuation of application No. PCT/CN2012/071775, filed on Feb. 29, 2012.

(30) Foreign Application Priority Data

Mar. 2, 2011    (CN) .......................... 2011 1 0050087

(51) Int. Cl.
*H04W 12/08*    (2009.01)
*H04W 48/02*    (2009.01)
*H04W 8/18*    (2009.01)
*H04W 84/04*    (2009.01)

(52) U.S. Cl.
CPC .............. *H04W 12/08* (2013.01); *H04W 48/02* (2013.01); *H04W 8/186* (2013.01); *H04W 84/045* (2013.01)

(58) Field of Classification Search
CPC ..................................................... H04W 12/08
See application file for complete search history.

(56) References Cited

U.S. PATENT DOCUMENTS

| | | |
|---|---|---|
| 2009/0285166 A1 | 11/2009 | Huber et al. |
| 2010/0075635 A1 | 3/2010 | Lim et al. |

(Continued)

FOREIGN PATENT DOCUMENTS

| | | |
|---|---|---|
| CN | 101557562 A | 10/2009 |
| CN | 101730102 A | 6/2010 |

(Continued)

OTHER PUBLICATIONS

Vodafone, et al., "Summary of offline Discussions on RAN sharing for H(e)NB," 3GPP TSG RAN WG2 #72, R2-106914, Nov. 15-19, 2010, 4 pages.

(Continued)

*Primary Examiner* — Jason Mattis
(74) *Attorney, Agent, or Firm* — Slater & Matsil, L.L.P.

(57) ABSTRACT

Embodiments of the present invention provide a cell access processing method and apparatus and a communication system. In a cell access processing method, an access request message is sent by a terminal. The access request message includes identification information of the terminal. A CSG information request message is sent to a CSG subscription information server of a roaming network. The CSG information request message includes the identification information of the terminal. A CSG information response message is sent by the CSG subscription information server according to the CSG information request message. The CSG information response message includes CSG information corresponding to the identification information of the terminal. Access control is performed on the terminal according to the CSG information.

16 Claims, 6 Drawing Sheets

(56) References Cited

U.S. PATENT DOCUMENTS

2010/0161794 A1* 6/2010 Horn et al. .................. 709/224
2010/0203865 A1   8/2010 Horn et al.
2011/0217978 A1* 9/2011 Horn ........................... 455/433
2012/0057574 A1* 3/2012 Horn ........................... 370/338

FOREIGN PATENT DOCUMENTS

WO   WO 2010059122 A1 * 5/2010 ............ H04W 12/08
WO      2010151805 A1   12/2010

OTHER PUBLICATIONS

International Search Report received in Application No. PCT/CN2012/071775 mailed Jun. 7, 2012, 6 pages.
3rd Generation Partnership Project; Technical Specification Group Services and System Aspects; General Packet Radio Service (GPRS) enhancements for Evolved Universal Terrestrial Radio Access Network (E-UTRAN) access (Release 10), 3GPP TS 23.401 V10.2.0, Dec. 2010, 276 pages.
Chinese Office Action received in Application No. 20111050087.X mailed Apr. 3, 2014, 5 pages.

* cited by examiner

CELL ACCESS PROCESSING METHOD AND APPARATUS AND COMMUNICATION SYSTEM

CROSS-REFERENCE TO RELATED APPLICATIONS

This application is a continuation of International Application No. PCT/CN2012/071775, filed on Feb. 29, 2012, which claims priority to Chinese Patent Application No. 201110050087.X, filed on Mar. 2, 2011, both of which are hereby incorporated by reference in their entireties.

TECHNICAL FIELD

The present invention relate to the communication field, and in particular, to a cell access processing method and apparatus and a communication system.

BACKGROUND

To provide a higher data transmission rate and a shorter delay and at the same time reduce operating costs of an operator, the 3GPP puts forward an access service based on a home evolved node B (H(e)NB). The H(e)NB, as a private device, allows only a specific subscriber group to access an evolved packet system (EPS), a universal mobile telecommunications system (UMTS), or a general packet radio service (GPRS) system, and the subscriber group allowed to access the network through the H(e)NB is referred to as a closed subscriber group (CSG).

Using the EPS network as an example, one terminal may join multiple CSGs, while the multiple CSGs may belong to a home public land mobile network (HPLMN), and may also belong to a visited public land mobile network (Visit VPLMN) having a roaming agreement with the HPLMN. The terminal may locally store an allowed CSG list (ACL), and a home subscriber server (HSS) in the HPLMN also stores an ACL for the terminal, where the ACL records information of all CSGs allowed to be accessed by the terminal. When the terminal initiates registration with a CSG cell in the HPLMN or VPLMN, the HSS may send the stored ACL to a mobility management entity (MME) as a basis for performing access control on the terminal. If the terminal has the CSG subscription, the MME may accept the access request, otherwise, the MME may reject the access request of the terminal.

No matter whether the terminal initiates registration with a CSG cell in the HPLMN or a CSG cell in the VPLMN, allowed CSG information of the terminal is maintained and provided by the home network, resulting in low flexibility of CSG access control.

SUMMARY OF THE INVENTION

Embodiments of the present invention provide a cell access processing method and apparatus and a communication system, so as to improve flexibility of CSG access control.

An embodiment of the present invention provides a cell access processing method. An access request message is sent by a terminal. The access request message includes identification information of the terminal. A CSG information request message is sent to a CSG subscription information server of a roaming network. The CSG information request message includes the identification information of the terminal. A CSG information response message is sent by the CSG subscription information server according to the CSG information request message. The CSG information response message includes CSG information corresponding to the identification information of the terminal. Access control on the terminal is performed according to the CSG information.

An embodiment of the present invention provides a cell access processing apparatus. A first receiving module is configured to receive an access request message sent by a terminal. The access request message includes identification information of the terminal. A first sending module is configured to send a CSG information request message to a CSG subscription information server of a roaming network. The CSG information request message includes the identification information of the terminal. A second receiving module is configured to receive a CSG information response message that is sent by the CSG subscription information server according to the CSG information request message. The CSG information response message includes CSG information corresponding to the identification information of the terminal. An access control module is configured to perform access control on the terminal according to the CSG information.

An embodiment of the present invention provides a communication system that includes the cell access processing apparatus and a CSG subscription information server that communicates with the cell access processing apparatus.

In the embodiments of the present invention, CSG information for controlling access of a terminal is managed and maintained by a roaming network. When performing access control on the terminal, a cell access processing apparatus may obtain the CSG information of the terminal by sending a CSG information request message to a CSG subscription information server of the roaming network and without depending on a home network of the terminal. In this manner, the cell access processing apparatus can perform access control on the terminal according to the CSG information maintained by the roaming network. Therefore, the embodiments of the present invention can improve flexibility of CSG access control.

BRIEF DESCRIPTION OF THE DRAWINGS

To describe the technical solutions in the embodiments of the present invention or in the prior art more clearly, the following briefly introduces accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
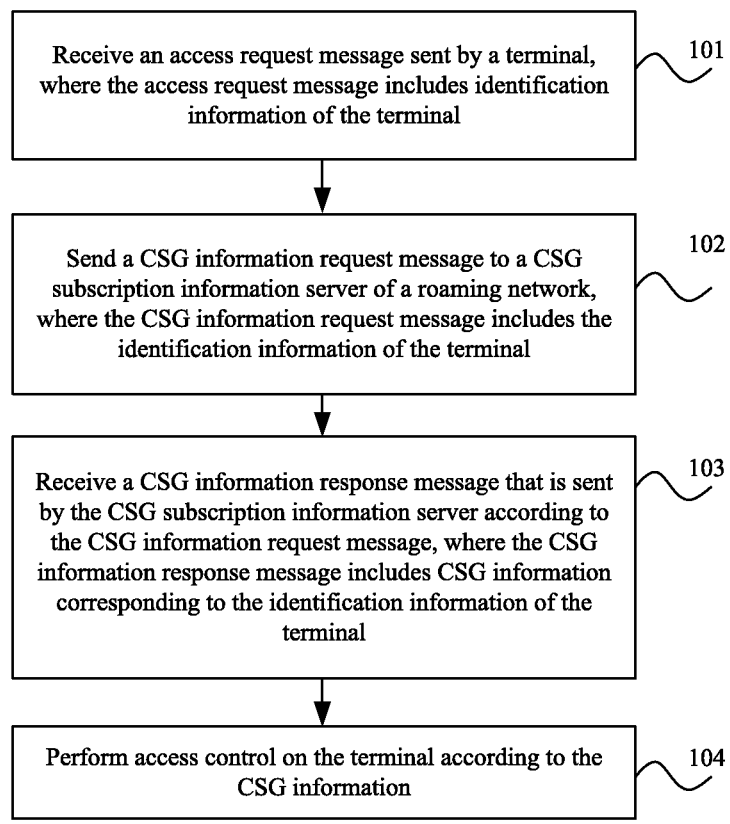
FIG. 1 is a flowchart of a first embodiment of a cell access processing method according to the present invention.

FIG. 1 is a flowchart of a first embodiment of a cell access processing method according to the present invention. As shown in FIG. 1, the method in this embodiment may include the following steps.

Step 101: Receive an access request message sent by a terminal, where the access request message includes identification information of the terminal.

For example, an MME in a VPLMN may receive an access request message sent by a terminal, where the access request message may include identification information of the terminal. This embodiment does not limit the identification information of the terminal.

The access request message in this embodiment may be an attach request, a location update request, or a service request, which is not limited by this embodiment.

Step 102: Send a CSG information request message to a CSG subscription information server of a roaming network, where the CSG information request message includes the identification information of the terminal.

The MME sends a CSG information request message to a CSG subscription information server (CSG Subscriber Server, hereinafter referred to as CSS) of the VPLMN, so as to obtain CSG information of the terminal from the CSS of the VPLMN. For example, the MME may send a CSG information request message to the CSS of the VPLMN after determining, according to the identification information of the terminal, that the terminal is a roaming mobile terminal.

Specifically, in this embodiment, the CSS in the VPLMN may be used to store the CSG information of the terminal, so that the VPLMN can manage and maintain the CSG information of the terminal. The CSS may be an independent network element, and may also be deployed on another network element, where the other network element may be a network element such as an HSS and MME of the roaming network.

Step 103: Receive a CSG information response message that is sent by the CSG subscription information server according to the CSG information request message, where the CSG information response message includes CSG information corresponding to the identification information of the terminal.

The MME may receive the CSG information response message that is sent by the CSS, where the CSG information response message may include the CSG information of the terminal.

Step 104: Perform access control on the terminal according to the CSG information.

After obtaining the CSG information, the MME can perform access control on the terminal according to the CSG information.

This embodiment does not limit a specific policy for the MME to perform access control according to the CSG information. Those skilled in the art may set the specific policy according to requirements, for example, refer to the subscription information of the terminal in the access control process.

In addition, it should be noted that the foregoing embodiment is described by using an EPS network as an example. However, the same technical solution may also be applied in a UMTS or GPRS network, and correspondence between corresponding network elements is as follows: The MME corresponds to a mobile switching center (Mobile Switching Center, hereinafter referred to as MSC) or a serving GPRS support node (Serving GPRS Support Node, hereinafter referred to as SGSN), and the HSS corresponds to a home location register (Home Location Register, hereinafter referred to as HLR).

In this embodiment, CSG information for controlling access of a terminal is managed and maintained by a roaming network; when performing access control on the terminal, an MME may obtain the CSG information of the terminal by sending a CSG information request message to a CSG subscription information server of the roaming network and without depending on a home network of the terminal, so that the MME can perform access control on the terminal according to the CSG information maintained by the roaming network. Therefore, this embodiment can improve flexibility of CSG access control.

In a specific implementation process, the VPLMN can not only cooperate with a HPLMN to manage and maintain CSG information, but also independently manage and maintain CSG information.

Figure 2:
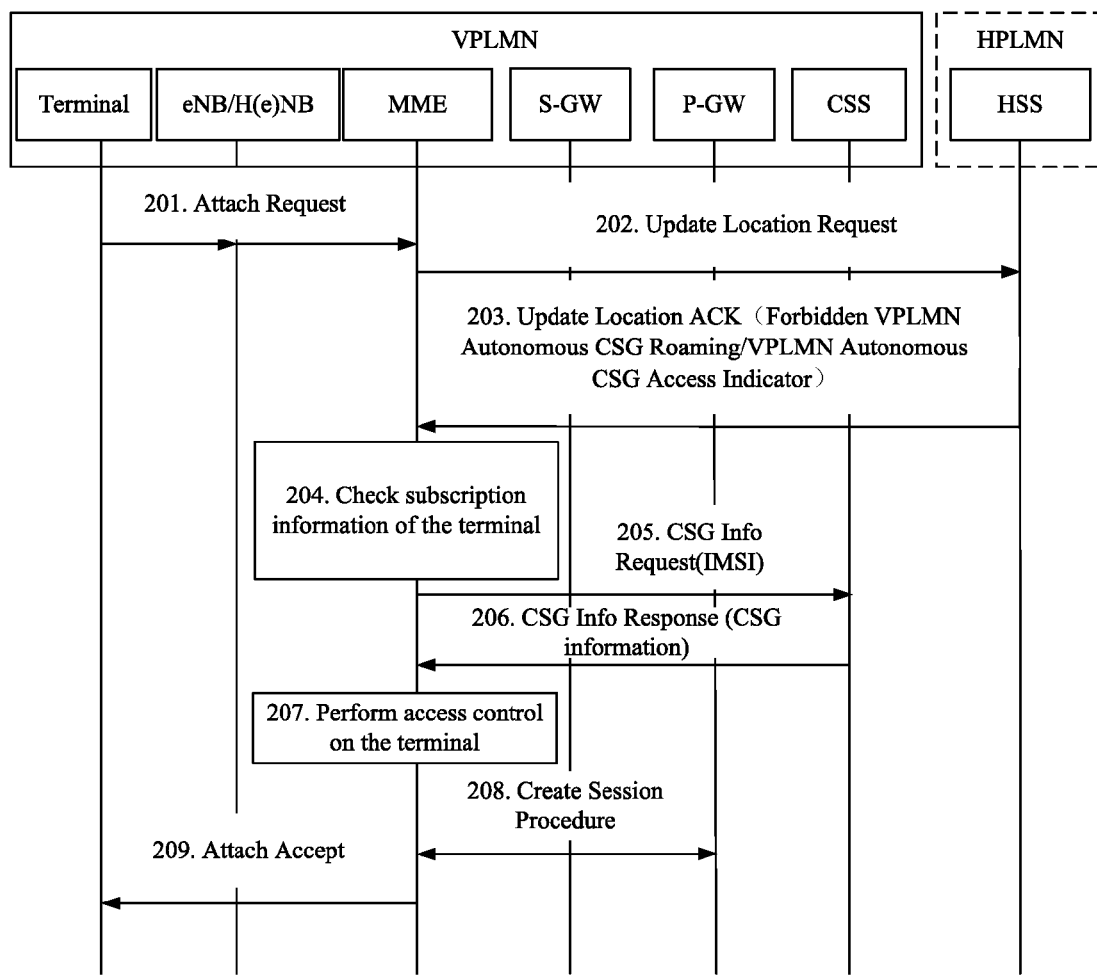
FIG. 2 is a signaling flowchart of a second embodiment of a cell access processing method according to the present invention.

FIG. 2 is a signaling flowchart of a second embodiment of a cell access processing method according to the present invention. As shown in FIG. 2, the method in this embodiment may include the following steps.

Step 201: A terminal sends an access request message to an MME in a VPLMN.

Specifically, the terminal may send the access request message to the MME in the VPLMN when entering the VPLMN.

The access request message in this embodiment may be an attach request, a location update request, or a service request, which is not limited by this embodiment. For example, the access request message may be an attach request.

The terminal may initiate a request through an eNB; if CSG roaming indicator information already stored on the terminal indicates that the VPLMN autonomous CSG roaming function is allowed, the terminal may also initiate a request through an H(e)NB. The CSG roaming indicator information is used to indicate that the VPLMN autonomous CSG roaming function is allowed or forbidden for the terminal in a VPLMN. In a specific implementation process, the CSG roaming indicator information may be forbidden VPLMN autonomous CSG roaming indicator information or VPLMN autonomous CSG roaming indicator information.

If the CSG roaming indicator information is Forbidden VPLMN Autonomous CSG Roaming indicator information, the CSG roaming indicator information may further include network identification information of the VPLMN, indicating that the VPLMN autonomous CSG roaming function is forbidden for the terminal. If the CSG roaming indicator information is VPLMN Autonomous CSG Roaming Indicator information, the CSG roaming indicator information may include network identification information of the VPLMN and a VPLMN autonomous CSG roaming indicator field, and by using different values of the VPLMN autonomous CSG roaming indicator field, indicate that the VPLMN autonomous CSG roaming function is allowed or forbidden.

Step 202: The MME sends an update location request message (Update Location Request) to an HSS in an HPLMN.

If the MME does not store context related to the terminal, the MME may send the update location request message to the HSS in the HPLMN of the terminal to obtain subscription information of the terminal. If the MME stores context related to the terminal, step 204 may be executed. If the access request initiated by the terminal is a location update request, the MME may execute step 204 after obtaining the context of the terminal from the MME corresponding to an area on which the terminal originally camps.

Step 203: The HSS returns an update location acknowledgment message (Update Location Ack) to the MME.

The message may subscription information of the terminal, where the subscription information includes Forbidden VPLMN Autonomous CSG Roaming indicator information or VPLMN Autonomous CSG Access Indicator information.

Step 204: The MME checks the subscription information of the terminal.

By checking the subscription information of the terminal, the MME may know whether the VPLMN autonomous CSG roaming function is allowed for the terminal.

If the MME finds that the Forbidden VPLMN Autonomous CSG Roaming indicator information in the subscription information does not include the network identification information of the VPLMN or the VPLMN Autonomous CSG Access Indicator information indicates that the VPLMN autonomous CSG roaming function is allowed for the terminal, and the MME does not store allowed CSG information of the roaming network of the terminal in the VPLMN, step 205 is executed.

If the MME finds that the Forbidden VPLMN Autonomous CSG Roaming indicator information in the subscription information does not include the network identification information of the VPLMN or the VPLMN Autonomous CSG Access Indicator information indicates that the VPLMN autonomous CSG roaming function is allowed for the terminal, and the MME stores allowed CSG information of the roaming network of the terminal in the VPLMN, step 207 is executed.

If the MME finds that the Forbidden VPLMN Autonomous CSG Roaming indicator information in the subscription information includes the network identification information of the VPLMN or the VPLMN Autonomous CSG Access Indicator information indicates that the VPLMN autonomous CSG roaming function is forbidden for the terminal, it is considered that the VPLMN autonomous CSG roaming function is forbidden for the terminal, and step 207 is executed.

Step 205: The MME sends a CSG information request message (CSG Info Request) to a CSS.

The MME may send the CSG information request message to the CSS to request allowed CSG information of the roaming network of the terminal, where the CSG information request message may include identification information of the terminal, for example, an international mobile subscriber identity (International Mobile Subscriber Identity, hereinafter referred to as IMSI), and may further include identification information of the HPLMN to which the terminal belongs.

Step 206: The CSS sends a CSG information response message (CSG Info Response) to the MME.

If the CSS stores the allowed CSG information of the roaming network of the terminal, the CSS may deliver, in the CSG Info Response message, the allowed CSG information of the roaming network of the terminal to the MME. The allowed CSG information of the roaming network may be identification information of the CSG allowed to be accessed by the terminal.

In this embodiment, the CSS may store the allowed CSG information of the roaming network in two manners.

Manner 1: The CSS stores an ACL of the terminal in the VPLMN.

The ACL of the terminal in the VPLMN includes identification information of all CSGs that the terminal is allowed to access in the VPLMN, for example, CSG IDs, and the CSS may directly send the ACL as allowed CSG information of the roaming network to the MME.

Manner 2: For each CSG ID, the CSS stores identification information of a terminal allowed to access the CSG, that is, a CSG member list corresponding to the CSG.

Before sending the allowed CSG information of the roaming network of the terminal to the MME, the CSS needs to generate the ACL of the terminal in the VPLMN according to all CSG member lists including the terminal, and include the ACL in the allowed CSG information of the roaming network of the terminal and then send the information to the MME.

In addition, before the CSS delivers the allowed CSG information of the roaming network to the MME, the CSS may determine, according to the identification information of the terminal, for example, the IMSI, or network identification information of the HPLMN of the terminal, whether VPLMN autonomous CSG roaming is forbidden for the terminal. Specifically, the CSS may also store CSG roaming indicator information, that is, the Forbidden VPLMN Autonomous CSG Roaming indicator information or VPLMN Autonomous CSG Access Indicator information. Before the CSS sends the allowed CSG information of the roaming network to the MME, the CSS further checks the CSG roaming indicator information. If the indicator information indicates that the VPLMN autonomous CSG roaming function is allowed for the mobile terminal, the CSS delivers the allowed CSG information of the roaming network. Otherwise, the CSS does not deliver the allowed CSG information of the roaming network, and carries prompt information in the CSG information response message, indicating that the VPLMN autonomous CSG roaming function is forbidden for the mobile terminal.

Step 207: The MME performs access control on the terminal.

Specifically, if the VPLMN autonomous CSG roaming function is allowed for the terminal, the MME may decide to accept or reject the access request of the terminal according to the allowed CSG information of the roaming network in the VPLMN and the subscription information of the terminal; if the VPLMN autonomous CSG roaming function is forbidden for the terminal, the MME may decide to accept or reject the access request of the terminal according to the subscription information of the terminal.

Step 208: The MME establishes a default bearer from a serving gateway (Serving Gateway, hereinafter referred to as S-GW) to a packet data network gateway (Packet Data Network Gateway, hereinafter referred to as P-GW).

If the MME accepts the access request of the terminal, the MME may establish the default bearer from the S-GW to the P-GW (Create Session Procedure).

It should be noted that this embodiment is described by using a roaming architecture for a local breakout of an EPS system as an example, and the S-GW and P-GW are located in the VPLMN. Those skilled in the art may understand that this embodiment is also applied to a case where the S-GW belongs to the VPLMN and the P-GW belongs to the HPLMN.

Step 209: The MME sends an attach accept message to the terminal.

The MME may send an Attach Accept message to the terminal, where the message may include the allowed CSG information of the roaming network, or the MME may also instruct the CSS to send the allowed CSG information of the roaming network to the terminal through an over-the-air technology (OTA) or open mobile alliance device management (OMA DM) technology after access is completed or when the terminal is in an idle state, so that the terminal can store or update the ACL. In addition, the terminal, after being powered off, may delete, from the ACL, allowed CSG information of the roaming network related to the VPLMN.

If the MME rejects the access request of the terminal, the MME may send an attach reject message to the terminal.

In this embodiment, the terminal may obtain and store the Forbidden VPLMN Autonomous CSG Roaming indicator information or VPLMN Autonomous CSG Access Indicator information when camping on the HPLMN, so as to indicate whether the terminal can access a CSG cell in the VPLMN. When the terminal initiates the access request in the VPLMN, the MME may find, from the subscription information of the terminal, the Forbidden VPLMN Autonomous CSG Roaming indicator information or VPLMN Autonomous CSG Access Indicator information indicating that the terminal is allowed to access a CSG in the VPLMN, and then, the MME may obtain the allowed CSG information of the roaming network of the terminal from the CSS of the VPLMN, and perform access control according to the allowed CSG information of the roaming network. In the access response message, the MME may further deliver the allowed CSG information of the roaming network to the terminal to provide subsequent CSG selection for the terminal. Therefore, in this embodiment, the CSG information of the roaming network may be maintained by both the HPLMN and the VPLMN, and flexibility of the CSG access control is improved.

The following describes in detail how the HPLMN stores the CSG roaming indicator information.

Specifically, the HPLMN may store the CSG roaming indicator information in the HSS by using the following two manners:

Manner 1: The HPLMN may store the CSG roaming indicator information into the subscription information of the terminal on the HSS.

If the HPLMN restricts the terminal from accessing the CSG of a roaming network, Forbidden VPLMN Autonomous CSG Roaming indicator information may be added to the subscription information of the terminal on the HSS, where the indicator information may include network identification information of a PLMN where the VPLMN autonomous CSG roaming function is forbidden; or VPLMN Autonomous CSG Roaming Indicator information is added to the subscription information, indicating whether the terminal is allowed to access a CSG of a roaming network, where the VPLMN Autonomous CSG Roaming Indicator information may include network identification information of the VPLMN and an indicator field. Different values of the indicator field indicate that access to a CSG of a roaming network is allowed or forbidden. One terminal may store multiple pieces of the foregoing information, and store VPLMN Autonomous CSG Roaming Indicator fields with different values for different roaming networks.

Manner 2: The HPLMN may store the CSG roaming indicator information into the CSG subscription information of the terminal on the HSS.

The HPLMN may add network identification information of the VPLMN and a VPLMN Autonomous CSG Roaming Indicator field to the CSG subscription information of the terminal on the HSS. Different values of the VPLMN Autonomous CSG Roaming Indicator field indicate that the VPLMN autonomous CSG roaming function is enabled or forbidden. There may be a plurality of such VPLMNs, and the value of an indicator field in each VPLMN may be independent.

In the second method embodiment shown in FIG. 2, the terminal has already obtained and stored the CSG roaming indicator information in the HPLMN before entering the VPLMN. Specifically, the HPLMN may deliver the CSG roaming indicator information stored in the HSS to the terminal in two manners:

Manner 1: The terminal is in the HPLMN currently. Because a change of CSG access in the VPLMN does not affect current use of a service, when the terminal initiates location update or another interaction process with the network, the VPLMN Autonomous CSG Access Indicator information or Forbidden VPLMN Autonomous CSG Roaming indicator information may be delivered to the terminal. In addition, the other interaction process with the network may be a service request process, a handover process, and so on. After obtaining the subscription information from the HSS, the MME carries the foregoing information to the terminal through another message sent to the terminal.

In a case where the HPLMN indicates that the terminal is forbidden to access the CSG of the roaming network, when in a network side, indicator information that access to the CSG of the roaming network is restricted is not configured or the value of the indicator information is allowing access to the CSG of the roaming network, the HPLMN does not deliver indicator information to the terminal; in a case where the HPLMN indicates that the terminal is allowed to access the CSG of the roaming network, the HPLMN may deliver the indicator information only when the indicator information for allowing access to the CSG of the roaming network is configured or the value of the indicator information is allowing access to the CSG of the roaming network, otherwise, the HPLMN does not need to deliver the indicator information to the terminal, and in this case, the terminal does not attempt to access the CSG in the roaming network. In addition, the HPLMN may deliver the indicator information to the terminal as long as the indicator information for access to the CSG of the roaming network is stored, and the terminal determines, according to the value of the indicator information, whether to attempt to access the CSG in the roaming network.

Manner 2: When the ACL is updated in an OMA DM or OTA manner, network identification information of the VPLMN and the VPLMN Autonomous CSG Access Indicator field are updated together, so that the terminal can store the foregoing information.

Figure 3:
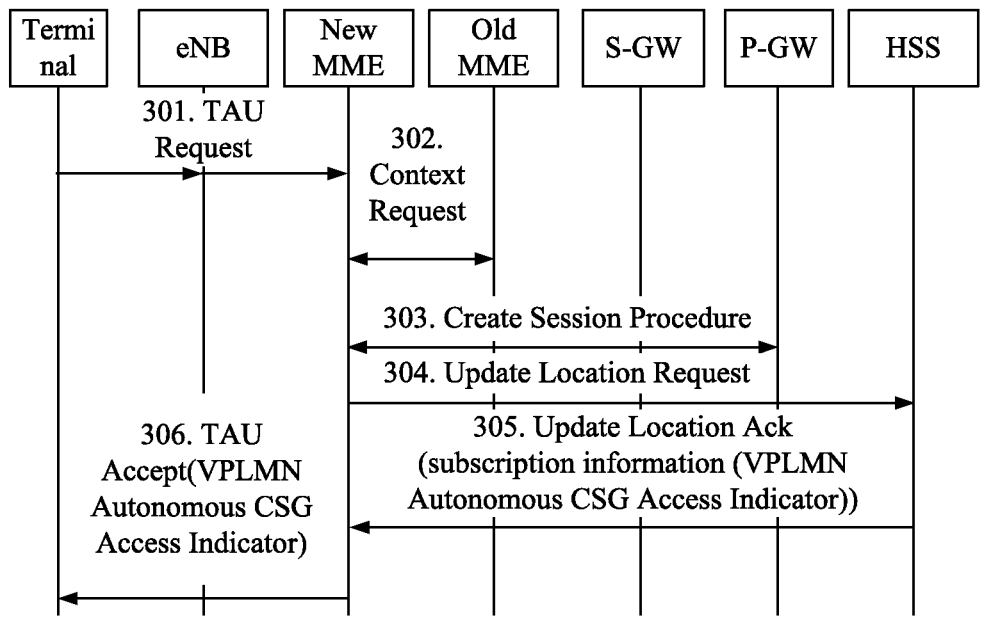
FIG. 3 is a signaling flowchart of obtaining CSG roaming indicator information by a terminal according to the second method embodiment shown in FIG. 2.

FIG. 3 is a signaling flowchart of obtaining CSG roaming indicator information by a terminal according to the second method embodiment shown in FIG. 2. As shown in FIG. 3, the solution is described by using an example in which the terminal performs a location update process in the HPLMN, and specifically includes the following steps.

Step 301: The terminal sends an update location request message to a new MME (hereinafter referred to as new MME).

Specifically, the terminal is in the HPLMN currently, and when the terminal moves, the terminal may initiate a location update to the new MME. The location update request may be forwarded to the new MME through a base station eNB. For example, the update location request may be a TAU Request.

Step 302: The new MME performs a context interaction with the old MME (hereinafter referred to as old MME) (Context Request).

Step 303: The new MME performs a create session procedure (Create Session Procedure) with the P-GW.

Step 302 and step 303 are implemented by using an existing location update interaction procedure, and are not further described herein.

Step 304: The new MME sends the update location request message (Update Location Request) to the HSS.

The Update Location Request may include the identification information of the terminal.

Step 305: The HSS sends an update location acknowledgment message (Update Location Ack) to the MME.

The Update Location Ack may include subscription information of the terminal obtained by the new MME from the HSS in a process of initiating a location update to the HSS, where the subscription information may store the Forbidden VPLMN Autonomous CSG Roaming indicator information; if the subscription information or the ACL or an allowed CSG list (Operator CSG List, hereinafter referred to as OCL) stores the VPLMN Autonomous CSG Roaming Indicator information, the HSS carries the VPLMN Autonomous CSG Roaming Indicator information in an update location acknowledgement message to the MME.

Step 306: The new MME sends an update location acknowledgment message (TAU Accept) to the terminal.

The new MME sends the TAU Accept to the terminal, where the message may include the Forbidden VPLMN Autonomous CSG Roaming indicator information or VPLMN Autonomous CSG Roaming Indicator information.

In this step, the terminal can obtain and store the Forbidden VPLMN Autonomous CSG Roaming indicator information or VPLMN Autonomous CSG Roaming Indicator information.

Figure 4:
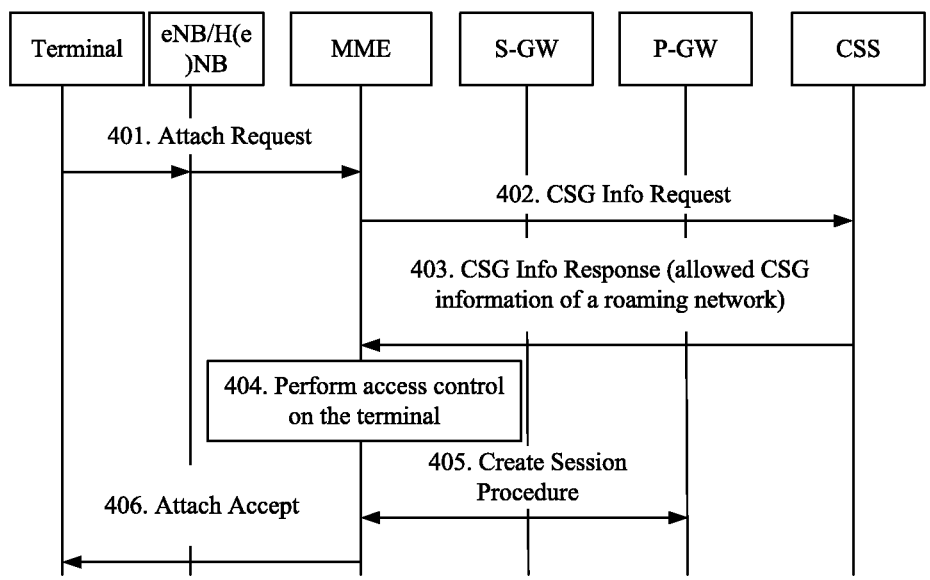
FIG. 4 is a signaling flowchart of a third embodiment of a cell access processing method according to the present invention.

FIG. 4 is a signaling flowchart of a third embodiment of a cell access processing method according to the present invention. This embodiment is applicable to a case where an MME does not obtain subscription information of a terminal from an HSS, for example, the MME already stores mobility management context of the terminal, or is applicable to a case where a VPLMN manages VPLMN autonomous CSG roaming. As shown in FIG. 4, the method in this embodiment may include:

Step 401: A terminal sends an access request message to an MME.

For example, the access request message may be an Attach Request.

Specifically, when the terminal enters a VPLMN, the terminal may initiate an access request through an eNB or H(e)NB.

Step 402: The MME sends a CSG information request message (CSG Info Request) to a CSS.

When the MME knows, according to identification information of the terminal, for example, an IMSI, that the terminal is a roaming subscriber the MME may send the CSG information request message to the CSS, where the message may include the identification information IMSI of the terminal.

Step 403: The CSS sends a CSG information response message (CSG Info Response) to the MME.

The CSG information response message may include allowed CSG information of a roaming network.

In this embodiment, the CSG information may be stored on the CSS mainly in the following two manners:

Manner 1: The CSS may store a forbidden VPLMN autonomous CSG roaming list. The list records identification information of a terminal forbidden to access a CSG in the VPLMN, where the identification information may be an IMSI of the terminal, a mobile station international ISDN number (MSISDN), or other information that can be used for uniquely identifying the terminal.

The list may show that some terminals in a PLMN are restricted from accessing the CSG in the VPLMN, and for the form of the list, reference may be made to Table 1, and the list may also show that all terminals in one PLMN are restricted from accessing the CSG in the VPLMN, and for the form of the list, reference may be made to Table 2.

Further, the CSS may store the allowed CSG information of the roaming network for a terminal for which a VPLMN autonomous CSG roaming function is not forbidden, in addition to the foregoing forbidden VPLMN autonomous CSG roaming list.

TABLE 1

| PLMN-1 | $1^{st}$ terminal ID |
| | $2^{nd}$ terminal ID |
| ... | ... |
| PLMN-n | $1^{st}$ terminal ID |

TABLE 2

| PLMN-1 |
| ... |
| PLMN-n |
| ... |

Manner 2: The CSS stores the allowed CSG information of the roaming network for only a terminal for which a VPLMN autonomous CSG roaming function is allowed, and a terminal for which allowed CSG information of the roaming network is not stored is regarded as a terminal for which the VPLMN autonomous CSG roaming function is forbidden or a terminal forbidden to access the CSG in the VPLMN.

In addition, an HPLMN may initiate a modification request for forbidding the VPLMN autonomous CSG roaming function, so as to modify the CSG information stored in the foregoing two manners.

Specifically, in a case where the CSS stores Table 1 and the allowed CSG information of the roaming network, if the modification request of the HPLMN is to restrict some terminals in the HPLMN from accessing the CSG in the VPLMN, the CSS may check whether Table 1 already includes network identification information of the HPLMN, and if includes, the CSS adds the identification information of the terminal to the network identification information of the HPLMN, and if the network identification information of the HPLMN is not included, the CSS adds the network identification information of the HPLMN and the identification information of the terminal to Table 1, and deletes, from the CSS, an ACL of a terminal belonging to the HPLMN, or deletes corresponding identification information of the terminal from a CSG member list, so as to restrict the terminal from accessing the CSG in the VPLMN. If the modification request is to allow a terminal, which is in Table 1 and restricted from accessing the CSG in the HPLMN, to access the CSG in the VPLMN, the CSS may delete the identifier of the terminal from an identifier list corresponding to the HPLMN in Table 1, and add the identifier of the terminal to an ACL of a terminal belonging to the HPLMN or the CSG member list.

In a case where the CSS stores Table 2 and the allowed CSG information of the roaming network, if the modification request of the HPLMN is to restrict all terminals in the HPLMN from accessing the CSG in the VPLMN, the CSS may check whether Table 2 already includes the network identification information of the HPLMN, and if the network identification information of the HPLMN is not included, the CSS adds the network identification information of the HPLMN to Table 2, and deletes, from the CSS, an ACL corresponding to all terminals belonging to the HPLMN, or deletes, from the CSG member list, identification information of a terminal belonging to the HPLMN. If the modification request is to restore rights of all terminals in an HPLMN for accessing the CSG in the VPLMN, the CSS may delete the network identification information of the HPLMN from Table 2.

In a case where the CSS stores only the allowed CSG information of the roaming network, if the modification request is targeted to some terminals in the HPLMN, the CSS directly deletes or adds an ACL corresponding to the terminals or corresponding identification information of the terminals in the CSG member list; if the request is targeted to all terminals in the HPLMN, the CSS directly deletes or adds the ACL corresponding to all terminals belonging to the HPLMN or identification information of all terminals belonging to the HPLMN in the CSG member list.

If the CSS knows, according to the identification information IMSI of the terminal or the network identification information of the HPLMN of the terminal, that VPLMN autonomous CSG roaming is forbidden for the terminal, the CSS may deliver forbidden VPLMN autonomous CSG roaming indicator information to the MME; if the CSS knows, according to the identification information IMSI of the terminal or network identification information of the HPLMN of the terminal, that the VPLMN autonomous CSG roaming function is allowed for the terminal, the CSS may send the allowed CSG information of the roaming network to the MME.

Step 404: The MME performs access control on the terminal.

If the terminal performs access through an ordinary eNB or the MME receives forbidden VPLMN autonomous CSG roaming indicator information from the CSS, the MME may perform access control on the terminal according to subscription information obtained from the HSS in the HPLMN of the terminal, so as to decide whether to accept or reject the access request. The process may be implemented by using the prior art, which is not further described herein.

If the CSS delivers the allowed CSG information of the roaming network of the terminal, but Forbidden VPLMN Autonomous CSG Roaming in subscription information of the terminal previously stored by the MME includes an identifier of the VPLMN or the VPLMN Autonomous CSG Access Indicator information indicates that VPLMN autonomous CSG roaming is forbidden or indicates that the terminal is forbidden to access the CSG in the VPLMN, or the forbidden VPLMN autonomous CSG roaming list delivered by the CSS includes an identifier of the home operator HPLMN of the terminal, but a VPLMN Autonomous CSG Access Indicator in subscription information included in mobility management context previously stored by the MME indicates that VPLMN autonomous CSG roaming is allowed or indicates that the terminal is allowed to access the CSG in the VPLMN, the MME performs access control on the terminal only according to the subscription information obtained from the HSS of the HPLMN of the terminal, and decides whether to accept or reject the access request.

If what the MME receives from the CSS is the allowed CSG information of the roaming network, and the terminal performs access through the H(e)NB, the MME may perform access control on the terminal according to the allowed CSG information of the roaming network and the subscription information obtained from the HSS of the HPLMN of the terminal, and decide whether to accept or reject the access request.

In this embodiment, it is assumed that the MME accepts the access request of the terminal after receiving the allowed CSG information of the roaming network sent by the CSS.

Step 405: The MME establishes a default bearer from an S-GW to a P-GW.

If the MME accepts the access request, the MME may establish the default bearer from the S-GW to the P-GW (Create Session Procedure).

Step 406: The MME sends an access accept message to the terminal.

The MME may send an Attach Accept message to the terminal, where the message may include allowed the CSG information, or the MME may also instruct the CSS to send the allowed CSG information of the roaming network to the terminal in an OMA DM or OTA manner after the access is completed or when the terminal is in an idle state, so that the terminal can store or update the ACL. In addition, the terminal, after being powered off, may delete, from the ACL, allowed CSG information of the roaming network related to the VPLMN.

If the MME rejects the access request of the terminal, the MME may send an access reject message to the terminal.

In this embodiment, when entering the VPLMN, the terminal may initiate an access request to the MME. If the MME finds that the terminal is a roaming subscriber, the MME may obtain the allowed CSG information of the roaming network of the terminal from the CSS and perform access control based on the information, and deliver the allowed CSG information of the roaming network in an access response message, or instruct the CSS to send the allowed CSG information of the roaming network to the terminal in the OMA DM or OTA manner after the access is completed or when the terminal is in the idle state. Therefore, in this embodiment, CSG information may be completely maintained by the VPLMN without participation of the HPLMN, and flexibility of CSG access control is improved.

Figure 5:
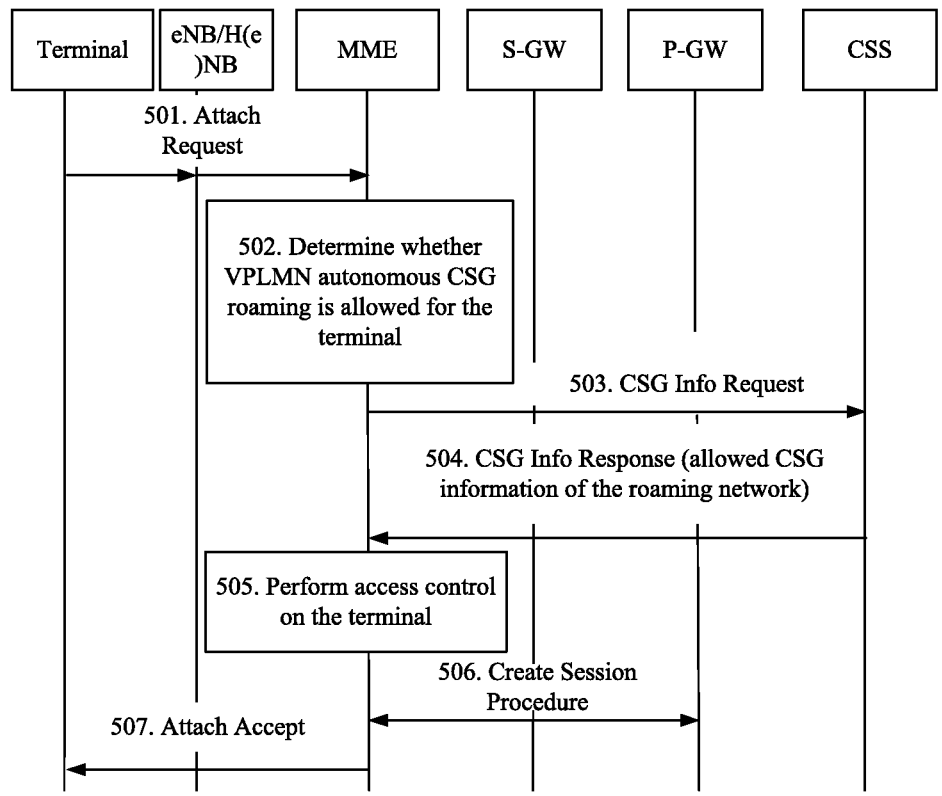
FIG. 5 is a signaling flowchart of a fourth embodiment of a cell access processing method according to the present invention.

FIG. 5 is a signaling flowchart of a fourth embodiment of a cell access processing method according to the present invention. As shown in FIG. 5, the method in this embodiment may include:

Step 501: A terminal sends an access request message to an MME.

Specifically, when the terminal enters a VPLMN, the terminal may initiate an access request through an eNB or H(e) NB. For example, the access request message may be an Attach Request.

Step 502: The MME determines whether VPLMN autonomous CSG roaming is allowed for the terminal.

In this embodiment, the MME may store the CSG roaming indicator information stored on the CSS in the third method embodiment shown in FIG. 4, for example, Table 1 or Table 2. After receiving the access request message of the terminal, the MME may determine, according to an IMSI of the terminal included in the message, whether to indicate that VPLMN autonomous CSG roaming is allowed for the terminal. If the MME knows that a VPLMN autonomous CSG roaming function is not forbidden for the terminal or that the terminal is allowed to access a CSG in the VPLMN, step 503 is executed.

If subscription information obtained by the MME from an HSS of an HPLMN of the terminal also includes CSG roaming indicator information, the MME compares a locally pre-stored forbidden VPLMN autonomous CSG roaming list with the VPLMN autonomous CSG roaming indicator information in the subscription information obtained from the HSS of the HPLMN of the terminal. If inconsistent, for example, the allowed VPLMN autonomous CSG roaming list stored by the MME includes an identifier of the HPLMN of the terminal, but the VPLMN Autonomous CSG Access Indicator information in the subscription information obtained by the MME from the HSS of the HPLMN of the terminal indicates that VPLMN autonomous CSG roaming is allowed or indicates that the terminal is allowed to access the CSG in the VPLMN, the MME performs access control on the terminal only according to the subscription information obtained from the HSS of the HPLMN of the terminal, and decides whether to accept or reject the access request.

If the MME knows that the VPLMN autonomous CSG roaming function is forbidden for the terminal or that the MME is not allowed to access the CSG in the VPLMN, the MME performs access control on the terminal only according to the subscription information obtained from the HSS of the HPLMN of the terminal, and decides whether to accept or reject the access request.

In this embodiment, it is assumed that the VPLMN autonomous CSG roaming is allowed for the MME.

Step 503: The MME sends a CSG information request message (CSG Info Request) to the CSS.

The message may include identification information IMSI of the terminal.

Step 504: The CSS sends allowed CSG information of a roaming network (CSG Info Response) to the MME.

The CSS may directly send the allowed CSG information of the roaming network or know, according to the identification information IMSI of the terminal or network identification information of the HPLMN of the terminal, whether the VPLMN autonomous CSG roaming is forbidden for the terminal, and if forbidden, the CSS may deliver forbidden VPLMN autonomous CSG roaming indicator information to the MME, otherwise, the CSS may deliver the allowed CSG information of the roaming network to the terminal.

Step 505: The MME performs access control on the terminal.

The access control may include that: according to the allowed CSG information of the roaming network and/or subscription information of the terminal, the MME may decide to accept or reject the access request of the terminal.

Step 506: The MME establishes a default bearer from an S-GW to a P-GW.

If the MME accepts the access request, the MME may establish the default bearer from the S-GW to the P-GW (Create Session Procedure).

Step 507: The MME sends an access accept message to the terminal.

The MME may send an Attach Accept message to the terminal, where the message may include the allowed CSG information of the roaming network, or the MME may also instruct the CSS to send the allowed CSG information of the roaming network to the terminal in an OMA DM or OTA manner after access is completed or when the terminal is in an idle state, so that the terminal can store or update the ACL. In addition, the terminal, after being powered off, may delete, from the ACL, allowed CSG information related to the VPLMN.

If the MME rejects the access request of the terminal, the MME may send an access reject message to the terminal.

In this embodiment, after the terminal initiates the access request when entering the VPLMN, the MME may find, according to the locally pre-stored forbidden VPLMN autonomous CSG roaming list, that the VPLMN autonomous CSG roaming function is not forbidden for the terminal or that the terminal is allowed to access the CSG in the VPLMN, and therefore the MME may obtain the allowed CSG information of the roaming network of the terminal from the CSS and perform access control based on the information, and deliver the allowed CSG information of the roaming network in an access response message, or instruct the CSS to send the allowed CSG information of the roaming network to the terminal in an OMA DM or OTA manner after the access is completed or when the terminal is in the idle state. In this embodiment, CSG information may also be completely maintained by the VPLMN without participation of the HPLMN, and flexibility of CSG access control is improved.

Figure 6:
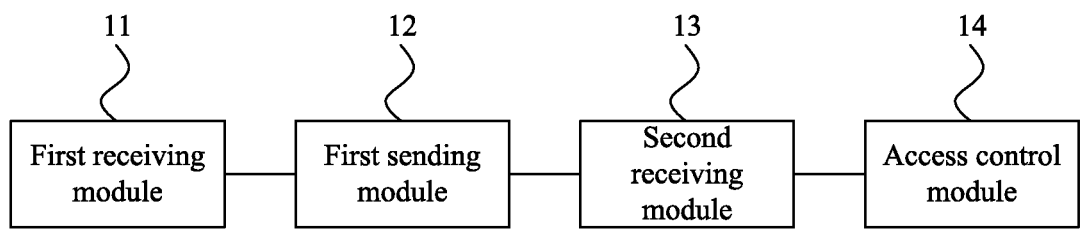
FIG. 6 is a schematic structural diagram of a first embodiment of a cell access processing apparatus according to the present invention.

FIG. 6 is a schematic structural diagram of a first embodiment of a cell access processing apparatus according to the present invention. As shown in FIG. 6, the cell access processing apparatus in this embodiment may include: a first receiving module 11, a first sending module 12, a second receiving module 13, and an access control module 14. The first receiving module 11 is configured to receive an access request message sent by a terminal, where the access request message includes identification information of the terminal; the first sending module 12 is configured to send a CSG information request message to a CSG subscription information server of a roaming network, where the CSG information request message includes the identification information of the terminal; the second receiving module 13 is configured to receive a CSG information response message that is sent by the CSG subscription information server according to the CSG information request message, where the CSG information response message includes CSG information corresponding to the identification information of the terminal; and the access control module 14 is configured to perform access control on the terminal according to the CSG information.

The cell access processing apparatus of this embodiment may be an MME, which can execute the method in the method embodiment shown in FIG. 1, and its implementation principle and technical effect are similar, and are not further described herein.

Figure 7:
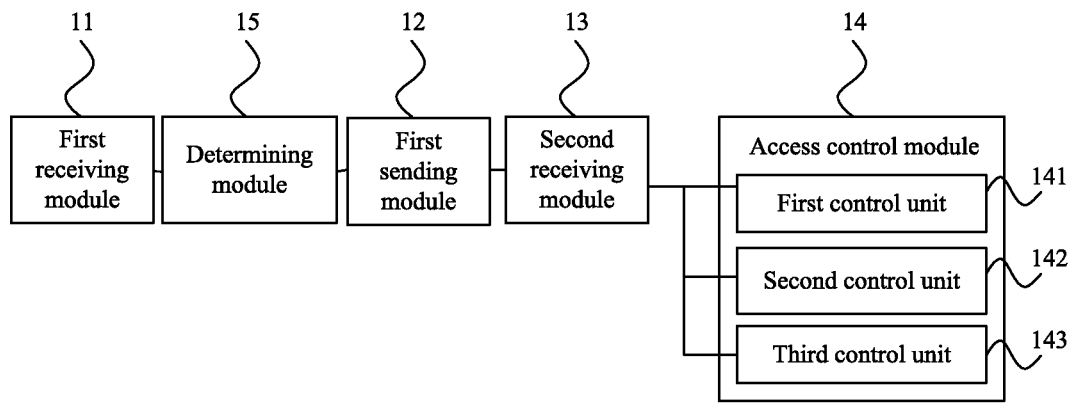
FIG. 7 is a schematic structural diagram of a second embodiment of a cell access processing apparatus according to the present invention.

FIG. 7 is a schematic structural diagram of a second embodiment of a cell access processing apparatus according to the present invention. As shown in FIG. 7, on the basis of the apparatus shown in FIG. 6, the apparatus in this embodiment further includes a determining module 15. The access control module 14 includes: a first control unit 141, a second control unit 142, and a third control unit 143. The determining module 15 is configured to determine, according to the identification information of the terminal, whether the terminal is a roaming terminal. The first sending module 12 is specifically configured to send the CSG information request message to the CSG subscription information server of the roaming network when the determining module 15 determines that the terminal is a roaming terminal. The first control unit 141 is configured to perform access control on the terminal according to the subscription information of the terminal, if the CSG information includes autonomous CSG roaming indicator information of the roaming network, and the autonomous CSG roaming indicator information of the roaming network is forbidden CSG roaming indicator information. The second control unit 142 is configured to perform access control on the terminal according to the allowed CSG information of the roaming network and the subscription information of the terminal, if the CSG information includes the autonomous CSG roaming indicator information of the roaming network and allowed CSG information of the roaming network, and the autonomous CSG roaming indicator information of the roaming network is allowed CSG roaming indicator information. The third control unit 143 is configured to perform access control on the terminal according to the allowed CSG information of the roaming network and the subscription information of the terminal, if the CSG information includes the allowed CSG information of the roaming network. It should be noted that the access control module 14 may also include only one or two of the first control unit 141, the second control unit 142, and the third control unit 143.

The cell access processing apparatus of this embodiment may be an MME, which can execute the method in the method embodiment shown in FIG. 2, 4, or 5, and its implementation principle and technical effect are similar, and are not further described herein.

Figure 8:
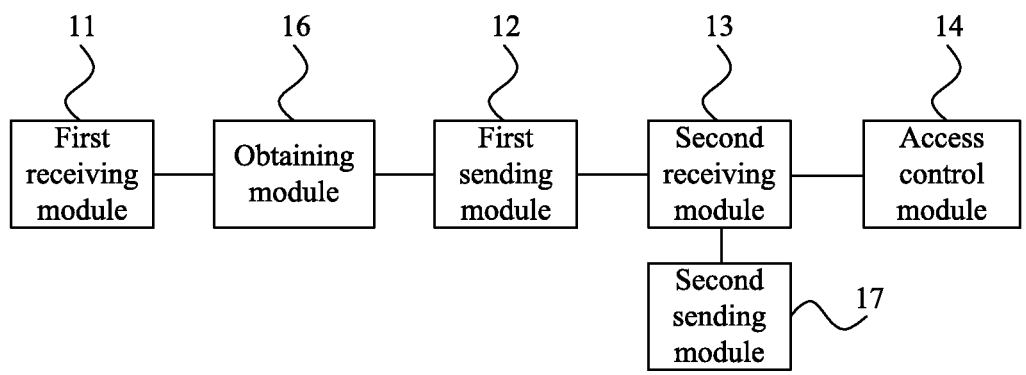
FIG. 8 is a schematic structural diagram of a third embodiment of a cell access processing apparatus according to the present invention.

FIG. 8 is a schematic structural diagram of a third embodiment of a cell access processing apparatus according to the present invention. As shown in FIG. 8, on the basis of the apparatus shown in FIG. 6, the apparatus of this embodiment further includes: an obtaining module 16 and a second sending module 17. The obtaining module 16 is configured to obtain CSG roaming indicator information that corresponds to the identification information and is in local CSG roaming indicator information; or obtain the subscription information of the terminal, where the subscription information includes CSG roaming indicator information of the terminal. The first sending module 12 is specifically configured to send a CSG information request message to the CSG subscription information server of the roaming network if the CSG roaming indicator information is allowed CSG roaming indicator information. The second sending module 17 is configured to: after the access control module 14 performs access control on the terminal according to the CSG information, send an access response message to the terminal, where the access response message includes the CSG information; or send an indication message to the CSG subscription information server to instruct the CSG subscription information server to send the CSG information to the terminal.

The cell access processing apparatus of this embodiment may be an MME, which can execute the method in the method embodiment shown in FIG. 2, 4, or 5, and its implementation principle and technical effect are similar, and are not further described herein.

Figure 9:
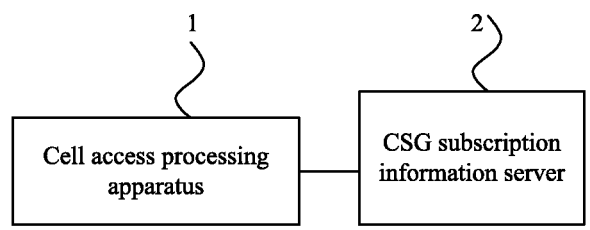
FIG. 9 is a schematic structural diagram of an embodiment of a communication system according to the present invention.

FIG. 9 is a schematic structural diagram of an embodiment of a communication system according to the present invention. As shown in FIG. 9, the system of this embodiment may include: a cell access processing apparatus 1 and a CSG subscription information server 2 communicating with the cell access processing apparatus 1. Specifically, the cell access processing apparatus 1 may be an MME.

The structure of the cell access processing apparatus 1 may be any structure in FIG. 6 to FIG. 8. Correspondingly, the cell access processing apparatus 1 may be used to execute the methods shown in FIG. 2, FIG. 4, and FIG. 5, and its implementation principle and technical effect are similar, and are not further described herein.

Persons of ordinary skill in the art may understand that all or part of the steps of the foregoing method embodiments may be implemented by a program instructing relevant hardware. The program may be stored in a computer readable storage medium. When the program is run, the steps of the foregoing method embodiments are performed. The storage medium may be any medium that is capable of storing program codes, such as a ROM, a RAM, a magnetic disk, or an optical disk.

Finally, it should be noted that the foregoing embodiments are merely used for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; and such modifications or replacements do not make essence of corresponding technical solutions depart from the spirit and scope of the technical solutions of the embodiments of the present invention.

What is claimed is:

1. A cell access processing method, comprising:
receiving an access request message sent by a terminal, wherein the access request message comprises identification information of the terminal;
sending a closed subscriber group information request message to a closed subscriber group subscription information server of a roaming network, wherein the closed subscriber group information request message comprises the identification information of the terminal;
receiving a closed subscriber group information response message that is sent by the closed subscriber group subscription information server according to the closed subscriber group information request message, wherein the closed subscriber group information response message comprises closed subscriber group information corresponding to the identification information of the terminal, and wherein the closed subscriber group information comprises autonomous closed subscriber group roaming indicator information of the roaming network and/or allowed closed subscriber group information of the roaming network; and
performing access control on the terminal according to the autonomous closed subscriber group roaming indicator information of the roaming network and/or the allowed closed subscriber group information of the roaming network, comprising:
if the closed subscriber group information comprises the autonomous closed subscriber group roaming indicator information of the roaming network and the autonomous closed subscriber group roaming indicator information of the roaming network is forbidden closed subscriber group roaming indicator information, performing access control on the terminal according to the subscription information of the terminal;
if the closed subscriber group information comprises the autonomous closed subscriber group roaming indicator information of the roaming network and the allowed closed subscriber group information of the roaming network, and the autonomous closed subscriber group roaming indicator information of the roaming network is allowed closed subscriber group roaming indicator information, performing access control on the terminal according to the allowed closed subscriber group information of the roaming network and the subscription information of the terminal; and
if the closed subscriber group information comprises the allowed closed subscriber group information of the roaming network, performing access control on the terminal according to the allowed closed subscriber group information of the roaming network and the subscription information of the terminal.

2. The method according to claim 1, wherein before sending the closed subscriber group information request message, the method comprises:
determining, according to the identification information of the terminal, that the terminal is a roaming terminal.

3. The method according to claim 1, wherein before sending the closed subscriber group information request message, the method comprises:
obtaining closed subscriber group roaming indicator information that corresponds to the identification information of the terminal and is in local closed subscriber group roaming indicator information; and
determining that the closed subscriber group roaming indicator information is allowed closed subscriber group roaming indicator information.

4. The method according to claim 1, wherein before sending the closed subscriber group information request message, the method comprises:
obtaining subscription information of the terminal, wherein the subscription information comprises closed subscriber group roaming indicator information of the terminal; and
determining that the closed subscriber group roaming indicator information is allowed closed subscriber group roaming indicator information.

5. The method according to claim 4, wherein obtaining subscription information of the terminal comprises obtaining the subscription information from context information of the terminal.

6. The method according to claim 4, wherein obtaining subscription information of the terminal comprises obtaining the subscription information from a home subscription information server.

7. The method according to claim 1, wherein the autonomous closed subscriber group roaming indicator information of the roaming network comprises identification information of a closed subscriber group forbidden or allowed to be accessed in the roaming network and home network identification information of the terminal or roaming network identification information of a closed subscriber group forbidden or allowed to be accessed.

8. The method according to claim 1, wherein the performing access control on the terminal according to the closed subscriber group information comprises:
if the closed subscriber group information is consistent with autonomous closed subscriber group roaming indicator information of the roaming network in the subscription information of the terminal, performing access control on the terminal according to the closed subscriber group information and the subscription information; and
if the closed subscriber group information is not consistent with autonomous closed subscriber group roaming indicator information of the roaming network in the subscription information of the terminal, performing access control on the terminal according to the subscription information.

9. The method according to claim 1, wherein after performing access control on the terminal, the method further comprises:
sending an access response message to the terminal, wherein the access response message comprises the closed subscriber group information.

10. The method according to claim 1, wherein after performing access control on the terminal, the method further comprises:
sending an indication message to the closed subscriber group subscription information server after sending an access response message to the terminal, so as to instruct the closed subscriber group subscription information server to send the closed subscriber group information to the terminal.

11. A cell access processing apparatus, comprising:
a first receiving module, configured to receive an access request message sent by a terminal, wherein the access request message comprises identification information of the terminal;
a first sending module, configured to send a closed subscriber group information request message to a closed subscriber group subscription information server of a roaming network, wherein the closed subscriber group information request message comprises the identification information of the terminal;
a second receiving module, configured to receive a closed subscriber group information response message that is sent by the closed subscriber group subscription information server according to the closed subscriber group information request message, wherein the closed subscriber group information response message comprises closed subscriber group information corresponding to the identification information of the terminal; and
an access control module, configured to perform access control on the terminal according to the closed subscriber group information, the access control module comprising one or more of the following units:
a first control unit, configured to, when the closed subscriber group information comprises autonomous closed subscriber group roaming indicator information of the roaming network, and the autonomous closed subscriber group roaming indicator information of the roaming network is forbidden closed subscriber group roaming indicator information, perform access control on the terminal according to the subscription information of the terminal;
a second control unit, configured to, when the closed subscriber group information comprises autonomous closed subscriber group roaming indicator information of the roaming network and allowed closed subscriber group information of the roaming network, and the autonomous closed subscriber group roaming indicator information of the roaming network is allowed closed subscriber group roaming indicator information, perform access control on the terminal according to the allowed closed subscriber group information of the roaming network and the subscription information of the terminal; and
a third control unit, configured to, when the closed subscriber group information comprises allowed closed subscriber group information of the roaming network, perform access control on the terminal according to the allowed closed subscriber group information of the roaming network and the subscription information of the terminal.

12. The apparatus according to claim 11, further comprising:
a determining module, configured to determine, according to the identification information of the terminal, whether the terminal is a roaming terminal;
wherein the first sending module is specifically configured to send the closed subscriber group information request message to the closed subscriber group subscription information server of the roaming network when the determining module determines that the terminal is a roaming terminal.

13. The apparatus according to claim 11, further comprising:
an obtaining module, configured to obtain closed subscriber group roaming indicator information that corresponds to the identification information and is in local closed subscriber group roaming indicator information or to obtain subscription information of the terminal, wherein the subscription information comprises closed subscriber group roaming indicator information of the terminal;
wherein the first sending module is specifically configured to send the closed subscriber group information request message to the closed subscriber group subscription information server of the roaming network if the closed subscriber group roaming indicator information is allowed closed subscriber group roaming indicator information.

14. The apparatus according to any one of claim 11, further comprising:
a second sending module, configured to, after the access control module performs access control on the terminal according to the closed subscriber group information, send an access response message to the terminal, wherein the access response message comprises the closed subscriber group information or to send an indication message to the closed subscriber group subscription information server to instruct the closed subscriber group subscription information server to send the closed subscriber group information to the terminal.

15. A communication system, comprising the cell access processing apparatus according to claim 11 and a closed subscriber group subscription information server of the cell access processing apparatus.

16. The system according to claim 15, wherein the cell access processing apparatus is a mobility management unit.

* * * * *